(12) United States Patent
Aldebert et al.

(10) Patent No.: US 9,946,673 B2
(45) Date of Patent: *Apr. 17, 2018

(54) NETWORK CONTROLLER—SIDEBAND INTERFACE PORT CONTROLLER

(71) Applicant: International Business Machines Corporation, Armonk, NY (US)

(72) Inventors: Jean-Paul Aldebert, Biot (FR); Claude Basso, Nice (FR); Jean-Luc Frenoy, Cagnes sur Mer (FR); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/857,999

(22) Filed: Sep. 18, 2015

(65) Prior Publication Data

US 2016/0132450 A1    May 12, 2016

(30) Foreign Application Priority Data

Nov. 7, 2014    (GB) .................... 1419819.6

(51) Int. Cl.
| | | |
|---|---|---|
| G06F 13/00 | (2006.01) | |
| G06F 13/362 | (2006.01) | |
| G06F 13/40 | (2006.01) | |

(52) U.S. Cl.
CPC ...... G06F 13/3625 (2013.01); G06F 13/4068 (2013.01)

(58) Field of Classification Search
CPC .................. G06F 13/3625; G06F 13/4068
See application file for complete search history.

(56) References Cited

U.S. PATENT DOCUMENTS

| 6,091,740 A * | 7/2000 | Karasawa | ............. H04J 3/1694 |
| | | | 370/442 |
| 7,594,095 B1 * | 9/2009 | Nordquist | ............. G06F 9/4843 |
| | | | 712/22 |

(Continued)

FOREIGN PATENT DOCUMENTS

| EP | 2669811 A1 | 12/2013 |
| WO | 2014150352 A1 | 9/2014 |

OTHER PUBLICATIONS

"OS-to-BMC Pass-through—A New Chapter in System Manageability", Doty et al., Dell Inc. Feb. 2012.*

(Continued)

*Primary Examiner* — Jing-Yih Shyu
(74) *Attorney, Agent, or Firm* — Christopher M. Coy

(57) ABSTRACT

A network interface controller includes a media access controller connected to receive an in-band packet and further connected to receive a sideband packet. The network interface controller includes a host adapter that includes a receive route connected to receive the in-band packet and the sideband packet from the media access controller, and further connected to transmit the in-band packet to a host. The network interface controller includes a sideband port controller comprising a sideband receive buffer. The host adapter further includes a first receive buffer to store the in-band packet and to store the sideband packet. The host adapter further includes an arbiter connected to allow, at a time, the in-band packet to advance from the first receive buffer along the receive route towards the host and further connected to allow, at a different time, the sideband packet to advance to the sideband receive buffer of the sideband port controller.

5 Claims, 7 Drawing Sheets

(56) References Cited

U.S. PATENT DOCUMENTS

| | | | |
|---|---|---|---|
| 8,321,616 | B2 | 11/2012 | Lambert et al. |
| 8,645,567 | B2 | 2/2014 | Shah et al. |
| 2007/0115981 | A1* | 5/2007 | Jreij .................... H04L 61/2015 370/392 |
| 2009/0164690 | A1 | 6/2009 | Slaight |
| 2009/0182799 | A1 | 7/2009 | Huang |
| 2009/0210601 | A1 | 8/2009 | Greenstein |
| 2010/0005190 | A1 | 1/2010 | Shah et al. |
| 2010/0192218 | A1 | 7/2010 | Shah et al. |
| 2011/0040917 | A1 | 2/2011 | Lambert et al. |
| 2011/0058573 | A1* | 3/2011 | Balakavi ............... H04L 49/602 370/463 |
| 2011/0078299 | A1 | 3/2011 | Nagapudi et al. |
| 2011/0202685 | A1 | 8/2011 | Subramaniam et al. |
| 2013/0080567 | A1 | 3/2013 | Pope |
| 2013/0179566 | A1 | 7/2013 | Jreij et al. |
| 2013/0326039 | A1 | 12/2013 | Shah |
| 2014/0165183 | A1* | 6/2014 | Dharmadhikari ... H04L 63/0227 726/13 |
| 2014/0344488 | A1 | 11/2014 | Flynn et al. |
| 2015/0124649 | A1* | 5/2015 | Itkin .................... H04L 41/0803 370/254 |
| 2015/0205746 | A1* | 7/2015 | Bailey .................. G06F 13/385 710/315 |
| 2015/0334018 | A1 | 11/2015 | Kutch |
| 2016/0127171 | A1* | 5/2016 | Kutch .................... H04L 67/10 709/223 |
| 2016/0132449 | A1 | 5/2016 | Aldebert et al. |
| 2016/0134529 | A1 | 5/2016 | Abel et al. |
| 2016/0134552 | A1 | 5/2016 | Aldebert et al. |
| 2016/0134559 | A1 | 5/2016 | Abel et al. |
| 2016/0134560 | A1 | 5/2016 | Aldebert et al. |
| 2017/0052913 | A1 | 2/2017 | Aldebert et al. |
| 2017/0052914 | A1 | 2/2017 | Aldebert et al. |

OTHER PUBLICATIONS

"Network Controller Sideband Interface (NC-SI) Specification" Version 1.0.1, DMTF, Jan. 24, 2013.*
Great Britain Application No. GB1419819.6, Office Action, dated May 4, 2016, 1 pg.
Great Britain Application No. GB1419819.6, Response to Office Action, dated May 18, 2016, 1 pg.
Great Britain Application No. GB1419819.6, Specification Amendment, dated May 18, 2016, 1 pg.
Great Britain Application No. GB1419819.6, Claim Amendment, dated May 18, 2016, 1 pg.
Great Britain Application No. GB1419819.6, Notification of Grant, dated Sep. 13, 2016, 2 pgs.
List of IBM Patents or Patent Applications Treated as Related, Nov. 2, 2016, 2 pages.
Aldebert et al., "Network Controller—Sideband Interface Port Controller," U.S. Appl. No. 15/343,347, filed Nov. 4, 2016.
Aldebert et al., "Network Controller—Sideband Interface Port Controller," U.S. Appl. No. 15/343,357, filed Nov. 4, 2016.
Unknown, "Network Controller Sideband Interface (NC-SI) Specification," Distributed Management Task Force, Inc., Document No. DSP0222, Version: 1.0.1, Jan. 24, 2013, 124 pages, Copyright © 2013 Distributed Management Task Force, Inc. (DMTF). All rights reserved.
GB Application 1419817.0, Entitled "NC-SI Port Controller," Filed Nov. 7, 2014.
International Search Report dated May 15, 2015 for International Application No. 1419817.0.
Doty et al., "OS-to-BMC Pass-through: A New Chapter in System Manageability," A Dell Technical White Paper, 7 pages, Feb. 2012, Rev 1.0, © 2012 Dell Inc.
Intel, "Maintaining the Ethernet Link to the BMC During Server Power Actions," Using the Advanced Manageability Feature of Intel Ethernet Controllers, Intel® LAN Access Division, Revision 1.0, Oct. 2012, 11 pages, Copyright © 2008-2012. Intel Corporation.
GB Application 1419819.6, Entitled "NC-SI Port Controller," Filed Nov. 7, 2014.
International Search Report dated May 15, 2015 for International Application GB1419819.6.
GB Application 1419818.8, Entitled "NC-SI Port Controller," Filed Nov. 7, 2014.
International Search Report dated May 15, 2015 for International Application GB1419818.8.
Aldebert et al., "Network Controller—Sideband Interface Port Controller," U.S. Appl. No. 14/857,978, filed Sep. 18, 2015.
Aldebert et al., "Network Controller-Sideband Interface Port Controller," U.S. Appl. No. 14/857,930, filed Sep. 18, 2015.
Aldebert et al., "Network Controller-Sideband Interface Port Controller," U.S. Appl. No. 14/857,952, filed Sep. 18, 2015.
Abel et al., "Network Controller-Sideband Interface Port Controller," U.S. Appl. No. 14/858,013, filed Sep. 18, 2015.
List of IBM Patents or Patent Applications Treated as Related, Sep. 16, 2015, 2 pages.
Abel et al., "Network Controller-Sideband Interface Port Controller," U.S. Appl. No. 14/929,447, filed Nov. 2, 2015.
Unknown, "NC-SI over MCTP Binding Specification," Distributed Management Task Force, Inc., Document No. DSP0261, Verson: 1.0.0, Aug. 22, 2013, 31 pages.
List of IBM Patents or Patent Applications Treated as Related, May 20, 2017, 2 pgs.

* cited by examiner

FIG. 7

NETWORK CONTROLLER—SIDEBAND INTERFACE PORT CONTROLLER

CROSS-REFERENCE TO RELATED APPLICATION

This application is related to and claims the benefit of United Kingdom Patent Application No. 1419819.6, filed Nov. 7, 2014, which application is incorporated by reference herein for all purposes.

BACKGROUND

Aspects of the present disclosure are related to handling of data traffic in relation to a network controller-sideband interface (NC-SI). In a computer or other network connected device (e.g. switches, routers, and network controllers) a baseboard management controller ("BMC") is a service processor or a microcontroller usually embedded on the motherboard of a server. The microcontroller uses sensors to report on matters such as temperature and fan speeds. The microcontroller may also control the operation of the system, including matters such as firmware updates, hardware configuration, power management, and monitoring. BMCs deployed in large network systems must be remotely accessible over the network, in particular via the network interface controller ("NC") of the managed device, or via a serial port connected to the microcontroller. An Intelligent Platform Management Interface ("IPMI") can specify a set of interfaces, protocols, and hardware buses for building such remote managed systems.

In such a network environment, the interface between the BMC and the NC can be referred to as the Network Controller-Sideband Interface (NC-SI). The NC-SI is a standardized interface that enables an NC to provide network access for a BMC, while allowing the NC to simultaneously and transparently provide network access for a host system. An NC-SI specification can define protocols and electrical specifications for a common Sideband Interface (SI) between a BMC and an 802.3 Local Area Network (LAN) via one or more external NCs. The NC-SI specification version 1.0.0 was published in July 2009 by the PMCI Working Group of the Distributed Management Task Force (DMTF).

SUMMARY

According to some embodiments of the present disclosure, aspects of the present disclosure may include a network interface controller. The network interface controller may include a media access controller connected to receive an in-band packet and further connected to receive a sideband packet. The network interface controller may also include a host adapter that includes a receive route connected to receive the in-band packet from the media access controller, further connected to receive the sideband packet from the media access controller, and further connected to transmit the in-band packet to a host. The host adapter may also include a sideband port controller that includes a sideband receive buffer. The host adapter may further include a first receive buffer to store the in-band packet from the media access controller and further to store the sideband packet from the media access controller. The host adapter may further include an arbiter connected to allow, at a time, the in-band packet in the first receive buffer to advance from the first receive buffer along the receive route towards the host and further connected to allow, at a different time, the sideband packet to advance to from the first receive buffer to the sideband receive buffer of the sideband port controller.

According to some embodiments of the present disclosure, aspects of the present disclosure may include a method of receiving data in a network interface controller. The method may include receiving, via a media access controller, an in-band packet from a network into a first receive buffer. The method may also include receiving, via the media access controller, a sideband packet from the network into the first receive buffer. The method may also include determining, with an arbiter, to transmit the in-band packet in the first receive buffer to a host. The method may further include determining, with an arbiter, to transmit the sideband packet in the first receive buffer to a sideband receive buffer. The method may further include transmitting, in response to the determining to transmit the in-band packet in the first receive buffer to the host, the in-band packet to the host. The method may further include transmitting, in response to the determining to transmit the sideband packet in the first receive buffer to the sideband receive buffer, the sideband packet to the sideband receive buffer.

BRIEF DESCRIPTION OF THE DRAWINGS

FIG. 7 illustrates a diagram of a structure of an AEN NC-SI packet, according to embodiments of the present disclosure.

DETAILED DESCRIPTION

A Network Controller-Sideband Interface (NC-SI) port controller (NPC) is a circuit that can provide a connection between a baseboard management controller (BMC) and a network interface controller (NC) for local and remote management traffic. It can allow two types of traffic to be carried between the BMC and the NC: "Control" traffic and "Pass-through" traffic. Control traffic consists of commands (requests) sent to the local NC for controlling and configuring it, responses sent by the NC back to the BMC, as well as Asynchronous Event Notifications ("AENs") in which the NC can send data back to the BMC without being prompted from the BMC. Pass-through traffic consists of packets that are transferred between an external network and the local BMC using the NC-SI. An NPC is not limited to communicating the sideband data with a BMC, but that is the usual endpoint for it.

Figure 1:
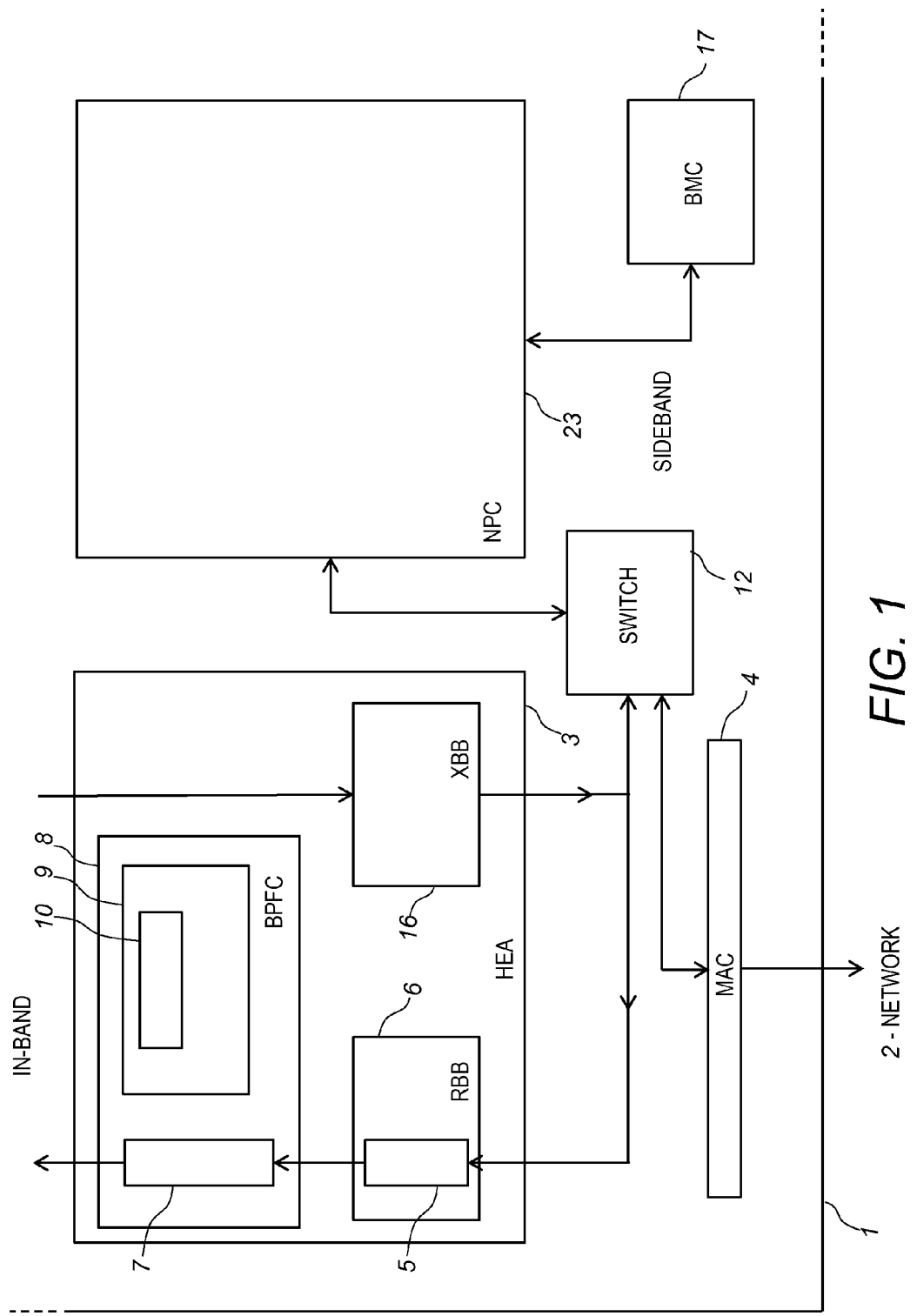
FIG. 1 illustrates a diagram of a device showing an example main network controller-sideband interface (NC-SI) connection.

FIG. 1 shows an example of a device 1 that can communicate with a network 2. The network 2 can handle the reception of packets into the device. The device 1 can include a host Ethernet adapter (HEA) 3. The device 1 can include an associated media access controller (MAC) 4. The MAC 4 can receive data from the network 2 via its communication line and can transmit the data to a line buffer 5 (via a switch 12). This buffer forms part of a receive backbone (RBB) 6. The RBB manages the movement of data from the MAC by converting, aligning, and storing the data into the line buffer 5. Once the RBB 6 stores the data, the RBB 6 transmits the data to a second buffer 7. The second buffer 7 forms part of a (BaRT-based finite state machine (BFSM))-based parser filter and checksum (BPFC) 8. The second buffer 7 is known in this case as the "data path".

The role of BPFC 8 is to analyze the packets in the second buffer 7 and make various decisions, for example, checking a checksum of a data packet that can be transmitted with the data packet. A various decision can also be to decide a packet queues to send the data packet to (the packet queues are not shown), i.e. those for distributing packets to other ports of the switch, classifying or discarding the packets, before they are forwarded to the main part of the device, i.e. the host. This can be accomplished with a packet parser 9 like that known from US2012/0159132 and US2012/0195208.

The packet parser 9 can include a rule processor 10 that can receive data from the data path buffer 7 and can then apply parsing rules to the received data. The parsing rules can include a test part and a result part. The test part can specify, among other things, values to compare with the received data and masks that can be applied to match a current rule. The result part can encode, among other things, a set of instructions and actions to be performed when the current rule is matched. This combination of comparisons and actions can be used to make the various decisions noted above. The rules can be loaded from a local store (and several are loaded into the rule processor 10 to be processed in parallel).

Transmit backbone unit (XBB) unit 16 can receive the packets from a host and can prepare them for transmission by the MAC 4 (via the switch 12). The MAC 4 can also pass traffic between the network 2 and a BMC 17. This traffic is known as pass-through traffic because it does not carry a local NC command or NC response. Pass-through packets from the BMC 17 to be transmitted over the network 2 can be received by an NPC unit 23 and can be passed from the NPC unit 23 to MAC 4 (via the switch 12), and packets received by the MAC 4 destined for the BMC can be handled by the NPC unit before being passed to the BMC. In FIG. 1 (and FIG. 2 discussed below) the NC can include the HEA 3, MAC 4, switch 12, and NC-SI port controller (NPC) 23, but may not include the BMC 17. The switch 12 is provided to route the packets between the MAC 4, the HEA 3 and the NPC 23.

Figure 2:
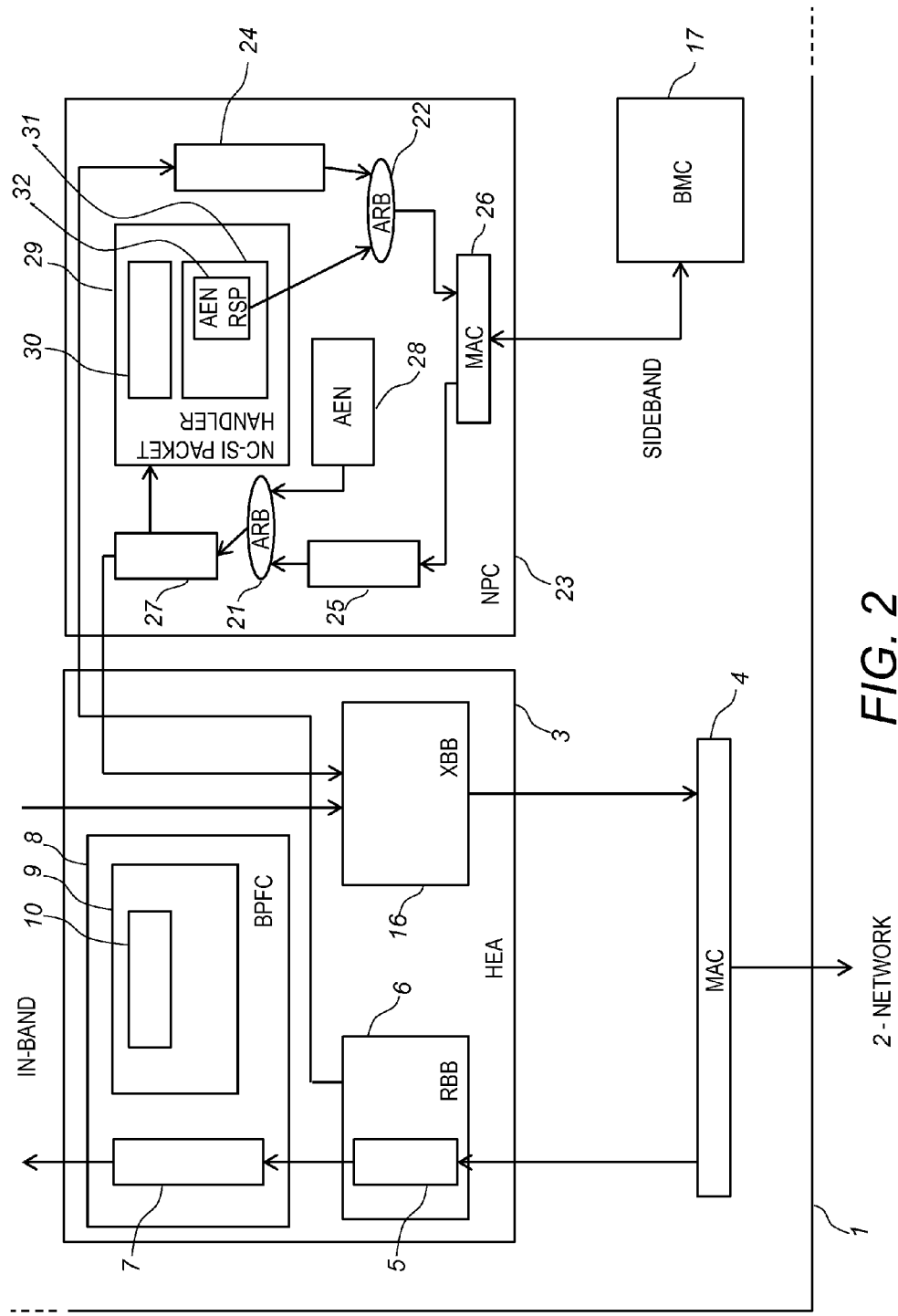
FIG. 2 illustrates a diagram of NC-SI connections, according to embodiments of the present disclosure.

FIG. 2 shows an embodiment of a device 1. This embodiment, in block diagram form, shows the internal circuit of the NC-SI port controller (NPC) 23 described in FIG. 1. NPC 23 can include a MAC 26, a first transmit buffer 25, an Asynchronous Event Notification Unit (AEN unit) 28, an NC-SI packet handler 29, a receive buffer 24, a transmit arbiter 21, and a receive arbiter 22. The MAC 26 is connected to receive packets from the BMC 17 and can operate to pass the received packets into the first transmit buffer 25. The packets can be passed from there, via the transmit arbiter 21 to a second transmit buffer 27. When the packets are at the second transmit buffer 27, the NC-SI packet handler 29 can examine them and can determine whether they should be forwarded to the XBB unit 16 (from where they can be forwarded to network 2 via MAC 4), or whether they should remain within the NPC 23 for further processing. The data sent to the NPC 23 by the BMC 17 can include commands for the NC such as, for example, enable/disable a channel or get parameters, as well as pass-through packets to be forwarded by the NIC on to the external network 2. The NC-SI port controller 23 can provide a transmit data route between an input at NPC MAC 26 and the output of the second transmit FIFO 27, which route can include NPC MAC 26, first transmit buffer 25 transmit arbiter 21, and second transmit buffer 27. Buffers that are include in the embodiments of the present disclosure can include a first in, first out (FIFO) method. The FIFO method can organize and manipulate a data buffer, where an oldest (first) entry, or 'head' of the queue, is processed first. A Wr request 286 is depicted.

Ethernet packets received into the NC-SI port controller 23 from the network via RBB unit 6 can be passed directly to the receive buffer 24. The receive arbiter 22 can choose between the NC-SI packet handler 29 and the receive buffer 24 for which packet to transmit next to the BMC 17. This can be accomplished by connecting the receive buffer 24 or the NC-SI packet handler 29 to the NPC MAC 26, which in turn can transmit it to the BMC. The NPC 23 can provide a receive data route between an input to receive buffer 24 and an output at NPC MAC 26, which route also can include those and the transmit arbiter 22. The receive buffer 24, can include an overrun mechanism that can drop incoming packets when it is full.

In some embodiments, the receive arbiter 22 can connect the NC-SI packet handler 29 to the MAC 26, thereby transmitting data from the NC-SI packet handler to the BMC. This data may be responsive to commands from the BMC, but may also be Asynchronous Event Notifications (AENs). In some other embodiments, the NPC can be in connection to a NC, the NC can include more than one external network connection. One of such connections is then referred to as a "channel", and one receive buffer (such as 24) can be provided per channel into the NPC. Asynchronous Event Notification packets (AENs) can enable the NC to deliver unsolicited notifications to the BMC when certain status changes occur in the NC. Each event consists of a specific AEN packet that the NPC can generate and then send to the BMC, the AEN packet discussed further in FIG. 7.

Figure 7:
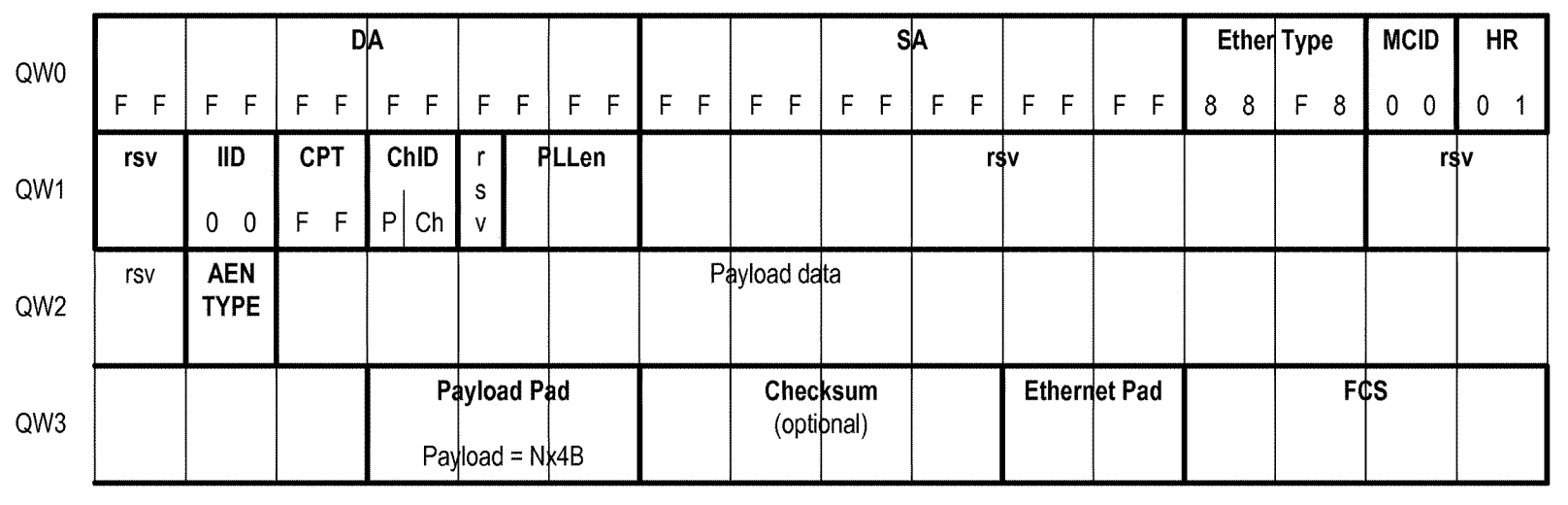

In embodiments, an AEN packet can include a certain structure. FIG. 7 depicts the packet format of a NC-SI AEN packet. The AEN packet comprises a plurality of ordered fields, where each field can have characteristics, such as size, length, position in a packet, content, possible values, etc. in accordance with an NC-SI specification. The different fields can be indicated using labels that indicate their function and/or content. A summary of the labelled fields and their associated function and/or content is as follows:

"DA" represents the Destination Address field of the Ethernet header that can encapsulate NC-SI packets. This field may not interpreted by the BMC and is always set to a broadcast address in a form of FF:FF:FF:FF:FF:FF.

"SA" represents the Source Address field of the Ethernet header which encapsulates all NC-SI-packets. The NC always sets this field to FF:FF:FF:FF:FF:FF for the NC-SI packets that it can generate.

"EtherType" represents the EtherType field of the Ethernet header which encapsulates all NC-SI packets. This field can be set to the value of 0x88F8.

"MCID" identifies the BMC which has issued the command. This field is fixed to the value of 0x00 in version 1.0.0 of the NC-SI specification.

"HR" identifies the version of the control packet header used by the sender. The value of 0x01 corresponds to version 1.0.0 of the NC-SI specification.

"IID" is a sequence number copied from the sequence identifier field used by the corresponding command sent by the BMC. This field is fixed to 0x00 because by definition, an AEN packet is never issued as a response to a previous BMC command and therefore an AEN packet does not need to be acknowledged with an IID sequence number.

"CPT" is a Control Packet Type field that identifies the current packet among 127 possible type of commands and 127 possible type of responses. Because an AEN packet is neither a command nor a response, this field is fixed to 0xFF.

"ChID" identifies the package ID and the internal channel ID of the NC which is issuing this AEN.

PLLen contains the length of the payload data present in the current AEN packet, excluding Payload Pad and optional Checksum value.

"AEN-TYPE" can identify the type of AEN packet. Currently, only three AEN types are defined by the NC-SI specification version 1.0.0. These are the Link Status Change type (encoded with AEN-TYPE=0x0), the Configuration Required type (encoded with AEN-TYPE=0x1) and the Host NC Driver Status Change type (encoded with AEN-TYPE=0x2). AEN-TYPE values 0x3 . . . 0x7F are reserved and AEN-TYPE values 0x80 . . . 0xFF are for OEM-specific use.

"Payload Data" contains AEN packet-specific data.

"Payload Pad" are 0 to 3 Bytes used to align the Checksum field to a 32-bit boundary and make the overall Payload (Data+Pad) multiple of 4 Bytes. These padding bytes are always equal to 0x00.

"Checksum" is the 32-bit checksum compensation value computed as the 2's complement of the checksum over the 16-bit unsigned integer values that make up the AEN packet. The content of this field is optional and a value of all zeros can be set to specify that the checksum is not being provided for the current response.

"FCS" represents the Frame Check Sequence field of the Ethernet header which encapsulates all NC-SI packets.

As mentioned above, it is one of the tasks of the NPC 23 to generate and send such formatted AEN packets to the BMC. This it does when the NC-SI packet handler 29 is exposed to asynchronous events from the NC.

The NC-SI packet handler 29 is exposed to asynchronous events when an AEN pseudo-packet ends up into the second transmit buffer 27 and its content is parsed.

Figure 3:
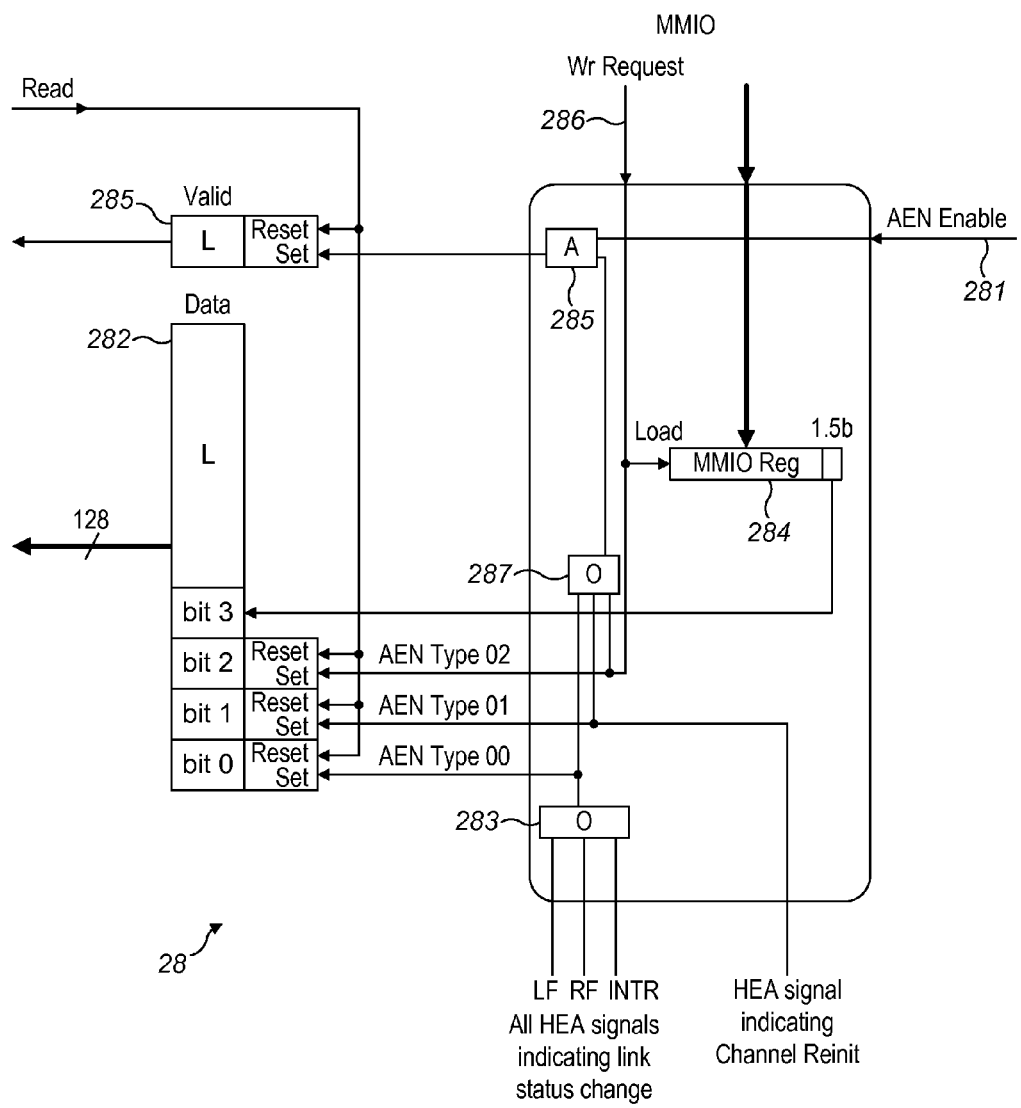
FIG. 3 illustrates a diagram of an asynchronous event notifications (AEN) unit, according to embodiments of the present disclosure.

AEN pseudo-packets are compiled by the AEN unit 28. The details of this unit are shown in FIG. 3, according to various embodiments. When enabled by an enable signal 281, this compiles an AEN pseudo-packet of up to 16 bytes (=128 bits) in a latch 282. In embodiments, the AEN pseudo-packet can contain four 1-bit flags so as to implement three AEN packet types that can be defined by the NC-SI specification version 1.0.0 (the rest of the bits can be unused). A larger AEN pseudo-packet can allow for it to be used by other circuits that have much more complex states to report than as NIC can have. Bit 0 of the AEN pseudo-packet is connected to be set if any of three signals from the HEA 3 that indicate that the status of the "external interface link", i.e. the connection to the network provided by the conductors or fiber optic connected to the MAC 4, has changed, which signals are grouped together by an OR gate 283. In embodiments, bit 1 of the AEN pseudo-packet is set if the network controller has transitioned to an error or a reset state which requires the interface to be re-initialized by the BMC. Bit 2 of the AEN pseudo-packet is set if there is a change in the state of the host driver of the NC. Bit 3 of AEN pseudo-packet corresponds to the payload field of an AEN packet of AEN-TYPE=2. This bit indicates whether NC driver for the host external network interface is operational ('1') or not ('0'), and is provided by a memory mapped IO (MMIO) register 284 which is accessible by the host. Finally the AEN unit 28 provides a valid signal being the logical AND, provided by AND gate 285, of the enable signal 281 and the logical OR, provided by OR gate 287, of the three AEN status signals from the HEA. So this signal indicates that there is some AEN status to report.

Figure 4:
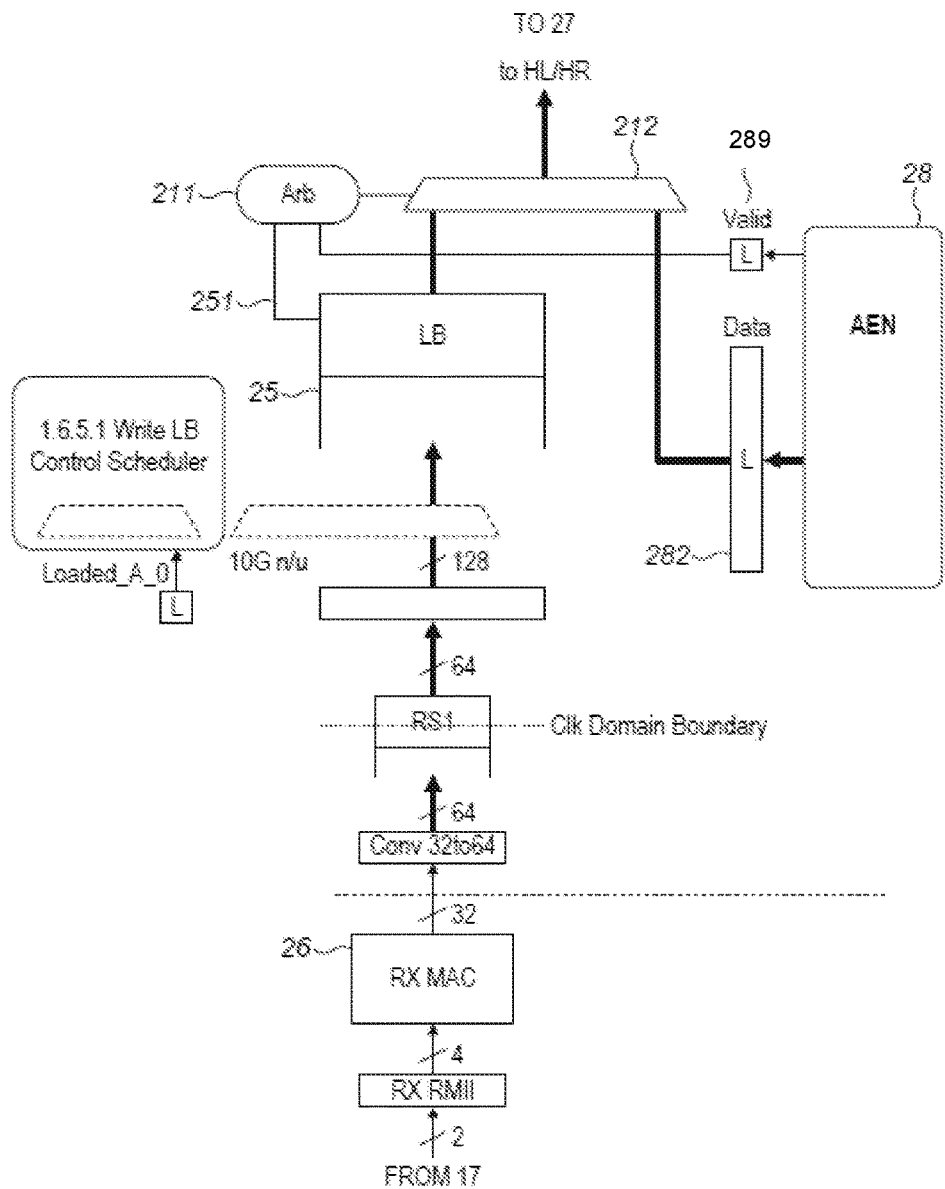
FIG. 4 illustrates a diagram of a circuit around a transmit arbiter, according to embodiments of the present disclosure.

FIG. 4 shows a first part of how the AEN pseudo-packet can be delivered to NC-SI packet handler 29 shown in FIG. 2, according to various embodiments. This can show the route of the AEN pseudo-packet from the AEN unit 28 to the second transmit buffer 27. This can include the latch 282, a multiplexer 212 of the transmit arbiter 21, and the marked connection to the second transmit buffer 27. Arbitration logic 211 of transmit arbiter 21 receives the valid signal from AEN unit 28 and a signal 251 from the first transmit buffer 25 indicating its status and decides which should pass its packet to the second transmit buffer 27. It can then accordingly set multiplexer 212 of the transmit arbiter 21 to connect the second transmit buffer 27 to the first transmit buffer 25 or pseudo-packet latch 282. The data in the connected one of those is then passed to the second transmit buffer 27. The transmit arbiter 21 gives priority to the pseudo-packet latch 282 because its transmission is somehow equivalent to the generation of a software interrupt in the context of a general purpose processor.

FIG. 2 shows the second part of how the AEN pseudo-packet is delivered to the BMC 17. The NC-SI packet handler 29 can read data from the AEN pseudo-packet in the second transmit buffer using a sliding window, i.e. a parallel set of connections to a portion of the data, the portion being determined by a pointer. The NC-SI packet handler 29 has a packet parser 30. This has similar structure and operation to that of the BPFC unit 8 in that it has rules coded in wide instruction words which can specify, among other things, values for comparing with the data words and masks to be applied in the comparison, which comparisons are used to identify conditions and make decisions, providing output accordingly. The rules in this case are rules for carrying out the functions of the NC-SI packet handler 29. AEN pseudo-packets are tagged with a control bit allowing the packet parser 30 to differentiate them from other NC-SI command packets and pass-through packets. The NC-SI packet handler 29 has a set 31 of action machines 32 which respond to the output of the packet parser 30 by taking various actions. In the case of the packet parser 30 identifying an AEN pseudo-packet, an AEN/RSP action machine 32 prepares one (and possibly multiple) AEN packet formatted according to the structure depicted in FIG. 7. When the AEN packet is ready for forwarding to the BMC 17, it can be presented to receive arbitrator 22, which decides when it should be passed to MAC 26, which can transmit it to the BMC 17.

When the packet parser 30 recognizes an NC-SI command packet in the second transmit buffer 27 it can apply a set of rules to it to decode the command and provides output to the AEN/RSP action machine 32 causing it to generate a NC-SI response packet containing the information sought by the command. Again, the AEN/RSP action machine 32 can format and presents the response packet to receive arbitrator 22, which can decide when it should be passed to MAC 26, which can transmit it to the BMC 17.

The receive arbitrator 22 can give priority to command responses and AEN packets to avoid the BMC becoming starved of those in the case of a long burst of pass-through packets for the BMC is received from the network.

Finally, the packets in the second transmit buffer 27 may be pass-through packets from the BMC bound for the network. These packets are recognized by the parser if they carry an EtherType value that is different from the NC-SI EtherType (i.e. 0x88F8), and if their source MAC address matches the settings of the external network interface. Once identified by the packet parser 30 of the NC-SI packet handler 29, the output of the sliding window can be passed to the XBB unit 16. The packet parser can advance the sliding window along the pass-through packet transmitting the packet data to the XBB unit 16 as it goes, terminating when a rule of the packet parser 30 finds an end of packet (EOP). No other rule processing is done by the packet parser 30, since the NC-SI is not concerned with the content of the packet.

The first and second transmit buffers 25, 27 can be provided with a pause mechanism, which can allow flow control of packets from the BMC 17. So, for example if the route from the BMC 17 to the network 2 becomes blocked by AEN pseudo-packets or packets from the HEA to the XBB unit 16, the BMC pauses sending its packets. This can be discussed further below.

Figure 5:
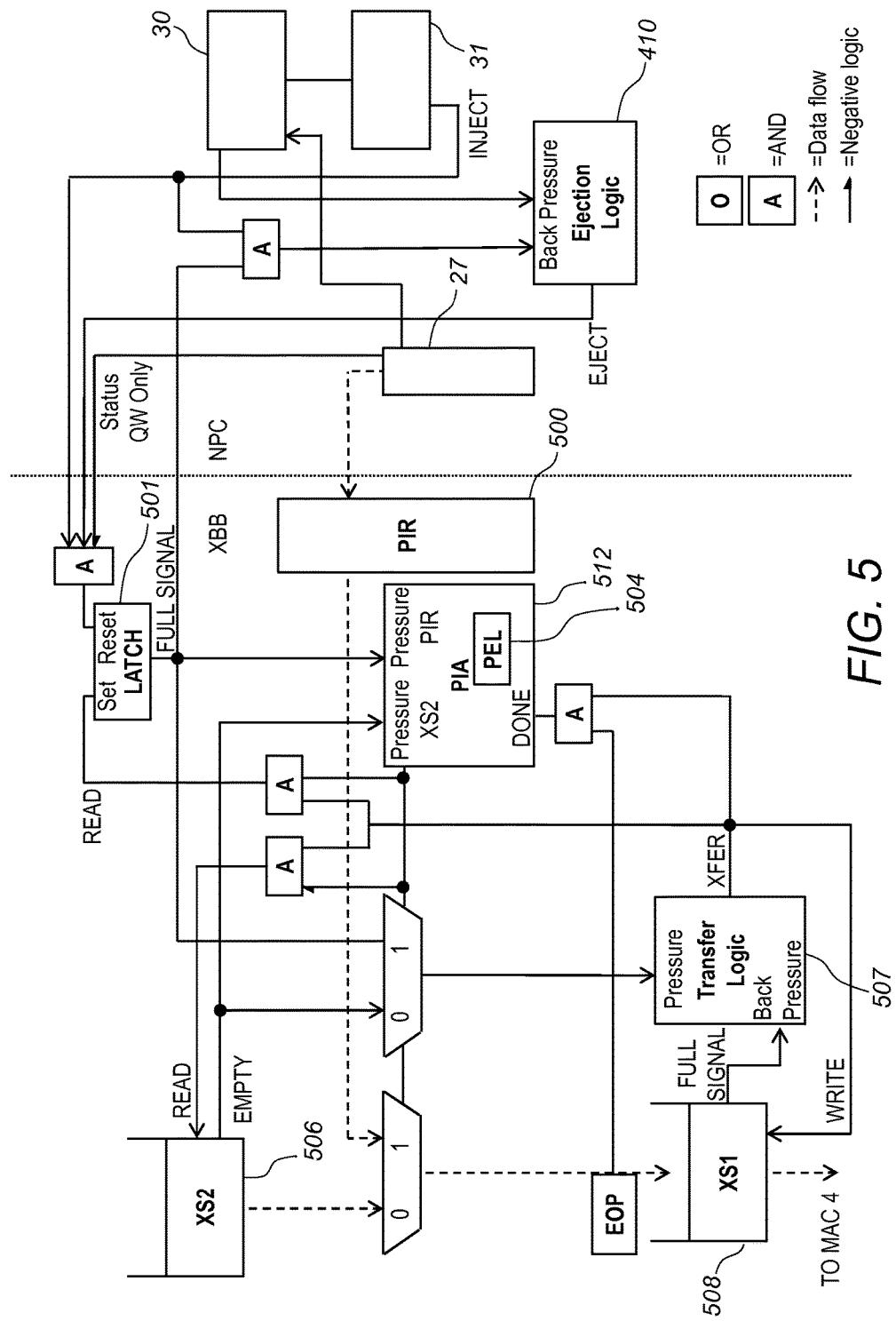
FIG. 5 illustrates a diagram of circuits for injecting pass-through traffic in the host traffic, according to embodiments of the present disclosure.

FIG. 5 is a block diagram of the relevant components in the XBB unit 16 and the NPC 23 for the injection of data packets from the BMC 17 into the XBB unit 16 and hence into the stream of packets transmitted by the main MAC 4, according to various embodiments. Note that in FIG. 5 and FIG. 6 the dashed connections show the path of the data packets.

Firstly, when a data packet has been forwarded to the second transmit buffer 27 of the NPC unit 23, as noted above, the packet parser 30 can read the packet then determine if the packet is an NC-SI command, AEN pseudo-packet or pass-through packet from the BMC 17 that is to be injected into the XBB unit 16.

If the data packet is an NC-SI command then the packet parser 30 examines the packet and signals ejection logic 410 to gate a back-pressure signal that it receives from the XBB unit 16, allowing the packet to be discarded from the second transmit buffer 27 after being processed and without entering the XBB unit 16. The back pressure signal, is a full signal from the XBB unit and indicates that it cannot receive further packets.

If the packet is a pass-through packet then the packet parser 30 does not gate the back pressure. The packet parser having analysed the packet, its outputs cause the action machine 32 to switch on an inject signal for the XBB unit 16.

If a packet injection register (PIR) 500 of the XBB unit 16 is not full (signalled by the back pressure/full signal from a latch 501), then the data packet is transferred from the buffer 27 to the PIR 500. This is apart from the part of the data packet containing the MAC status, which is not used in the XBB unit 16 and is discarded. The end of packet marker (EOP) triggers the latch 501 to be set, which indicates the PIR 500 is full.

Next, a packet injection arbiter (PIA) 512 of the XBB unit selects the next packet to be forwarded to an output XS1 buffer 508 of the XBB unit 16. This arbitration occurs when a packet is not engaged. Priority is given to an XS2 buffer 506, which receives normal data packets from the host into the XBB unit 16, but a "leak" mechanism is provided by the arbiter 512 so the network is not starved of pass-through traffic from the NPC unit 23. In the "leak" mechanism a counter is provided connected to increment when an in-band packet is advanced from XS1 to XS2 and to be reset when a packet is advanced from the NPC, and the arbiter 512 is arranged to allow a packet from the NPC packet to advance when the counter has reached a certain value. If the XS2 buffer 506 is empty, which indicated to the PIA 512 by that buffer's "empty" signal, then the PIR 500 is selected, and vice versa. Once the decision has been made, a packet engaged latch (PEL) 504 is set.

The data packet then transfers from the selected source (either the XS2 buffer 506 or the PIR 500) to an XS1 buffer 508 of the XBB unit 16. If the XS1 buffer 508 is full then a "full" signal from that buffer is sent to a transfer logic block 507, which gates the back pressure for this transfer (i.e. stops data packets being transferred from either the XS2 buffer 506 or the PIR 500). An end of packet (EOP) signal can be sent to the PIA 512 when the end of packet marker is transferred to the XS1 buffer 508, which resets the packet engaged latch (PEL) 504, and the arbitration decision process in the PIA 512 begins again.

The XS1 buffer 508 then transmits the received data packets to the main MAC 4. Note that injection of sideband packets at this point in the transmission of host data to the network also allows sideband packets to be looped-back to the receive path (i.e. via the RBB unit 3 and BFPC unit 8) to the host. This allows implementation of "OS2BMC" technology.

Figure 6:
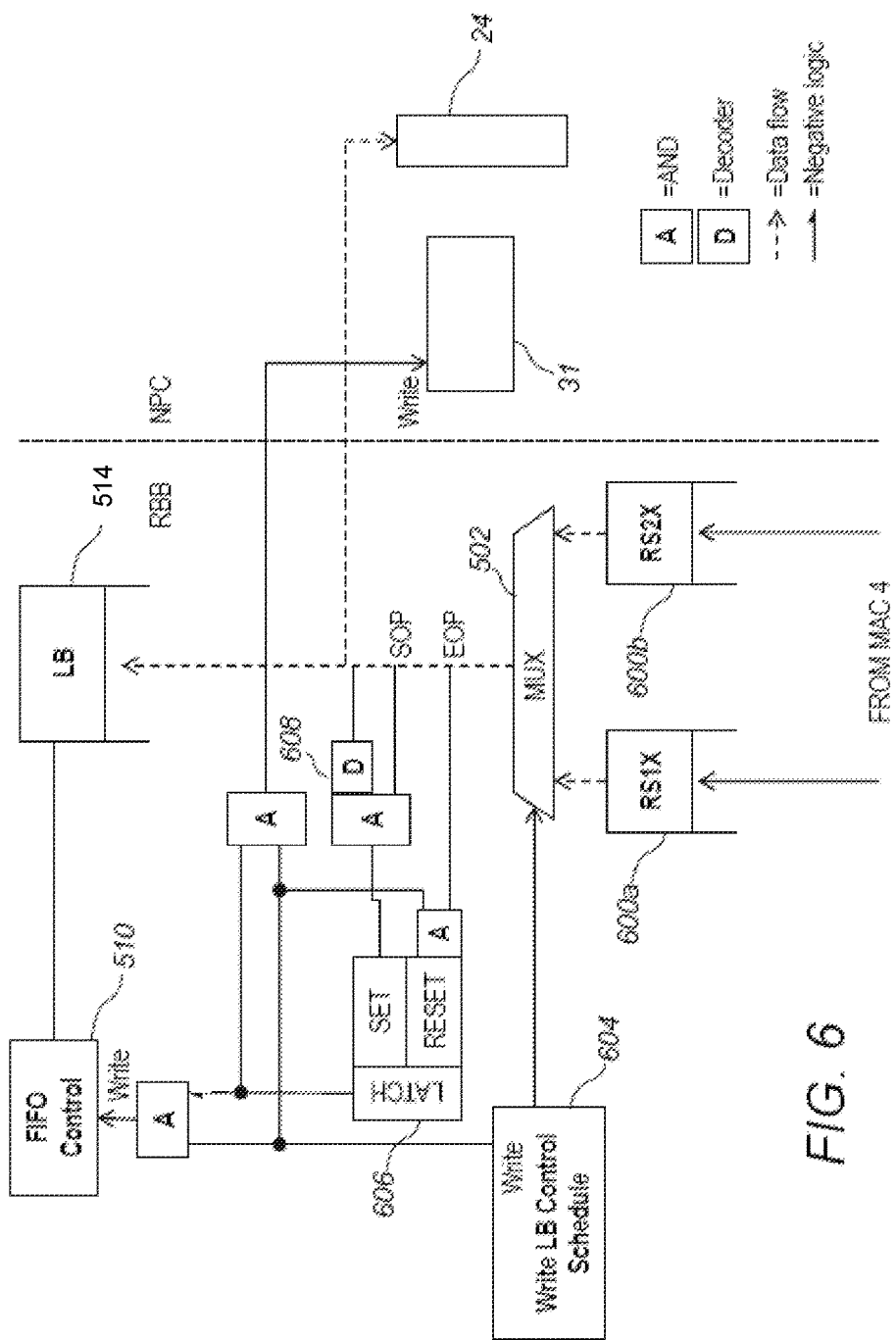
FIG. 6 illustrates a diagram of circuits for extracting pass-through traffic from the host traffic, according to embodiments of the present disclosure.

In FIG. 6, a block diagram of the relevant components in the RBB unit 6 and the NPC unit 23 for extracting data packets from the main traffic incoming to the device from the network that are destined for the BMC 17 can be seen, according to various embodiments. Write 31 and 24 are within the NPC as indicated by a dotted vertical line that is to the left of 31.

Firstly, data can be received by buffer RS1X 600a and buffer RS2X 600b of the RBB unit from the main MAC 4 then into MUX 502. A scheduler 604 can then decide which of those buffers the next data packet is selected from via an arbitration mechanism.

The selected data packet is read by a decoder 608. The decoder 608 reads the packet header. If the packet header says that the packet is destined for the BMC 17 then the decoder 608 sets a latch 606. If the packet header is not destined for the BMC 17 then the decoder does not set the latch 606.

The write control scheduler 604 then sends a "write" pulse. If the latch 606 is set, then the "write" pulse is sent to the action machines 32 in the NPC 23 and the packet can be sent to the receive buffer 24 of the NC-SI. If the latch is not set, the "write" pulse can be sent to a FIFO control 510 of the RBB unit and the packet can be sent to a line buffer (LB) 514 of the RBB unit.

Finally, the EOP marker of the packet triggers the latch 606 to reset, making the LB 514 the default recipient of incoming packets. In turn, packets in the LB 514 can be passed to the BPFC unit 8. In some embodiments, the LB 514 is a buffer that accepts and stores data sent from the MUX 502.

Whilst the present invention has been described and illustrated with reference to particular embodiments, it will be appreciated by those of ordinary skill in the art that the invention lends itself to many different variations not specifically illustrated herein.

The present invention may be a system or a method.

The block diagrams in the Figures illustrate the architecture, functionality, and operation of possible implementations of systems and methods according to various embodiments of the present invention. In this regard, each block in the block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams can be implemented by special purpose hardware-based systems that perform the specified functions or acts or carry out combinations of special purpose hardware and computer instructions.

What is claimed is:

1. A network interface controller comprising:
a media access controller (MAC) connected to receive in-band and sideband packets;
a host adapter comprising a receive route connected to receive packets from the media access controller, and further connected to transmit the in-band packets to a host; and
a sideband port controller comprising a sideband receive buffer, wherein the sideband port controller is configured to:
compile information into a set of asynchronous event notification (AEN) packets;
analyze the in-band packets to provide an indication that the in-band packet contains the set of AEN packets; and
forward the set of AEN packets to a sideband endpoint circuit in response to a packet parser providing the indication,
wherein the host adapter further comprises:
a first receive buffer to store a packet from the media access controller;
a packet injection arbiter (PIA) connected to allow, at a time, the in-band packet in the first receive buffer to advance from the first receive buffer along the receive route towards the host and further connected to allow, at a different time, the sideband packet to advance from the first receive buffer to the sideband receive buffer of the sideband port controller, wherein the PIA further comprises a decoder connected to read a header of a packet in the first receive buffer, and in response to reading the header, to route the packet towards the host or the sideband port controller;
an output XS1 buffer that is selected by the PIA to receive any forwarded packets;
an XS2 buffer configured to receive data packets that are not in-band data packets or sideband packets from the host into a receive backbone unit, the receive backbone unit being configured to manage movement of data from the MAC by converting, aligning, and storing the data into a line buffer, wherein the XS2 buffer receives priority over the output XS1 buffer;
a counter configured to be incremented when the in-band packet is advanced from the output XS1 buffer to the XS2 buffer; and
a packet engage latch that is set when either the output XS1 buffer or the XS2 buffer is selected to receive any incoming packet.

2. The network interface controller of claim 1, wherein the host adapter further comprises a second receive buffer on the receive route, the second receive buffer being connected to receive the in-band packets from the first receive buffer.

3. The network interface controller of claim 1, wherein the sideband port controller is connected to transmit the sideband packets to a sideband endpoint.

4. The network interface controller of claim 1, wherein at least one AEN packet of the set of AEN packets comprises: a destination address field; a source address field; an Ethernet type field; a media content (MC) identification (ID) field; a header field; a sequence number field; a control packet type field; a channel ID field; a pay load length field; an AEN type field; a payload data field; a checksum field; and a frame check sequence field.

5. The network interface controller of claim 1, further comprising:
a packet injection register (PIR) that is configured to accept data packets when the PIR has available bandwidth to store in-band packets and sideband packets; and
an end of packet (EOP) marker that is configured to trigger a latch to be set when the PIR has no available bandwidth.

* * * * *